July 1, 1969 D. DE WEGER 3,453,380

VARIABLE DELAY NETWORK

Filed Oct. 3, 1966

Inventor
Dirk de Weger

By James E. Tracy
Attorney

United States Patent Office 3,453,380

Patented July 1, 1969

3,453,380

VARIABLE DELAY NETWORK

Dirk de Weger, Lombard, Ill., assignor to Zenith Radio Corporation, Chicago, Ill., a corporation of Delaware Filed Oct. 3, 1966, Ser. No. 583,520

Int. Cl. H04n 1/44; H03h 7/30

U.S. Cl. 178—5.1 8 Claims

Figure 1:
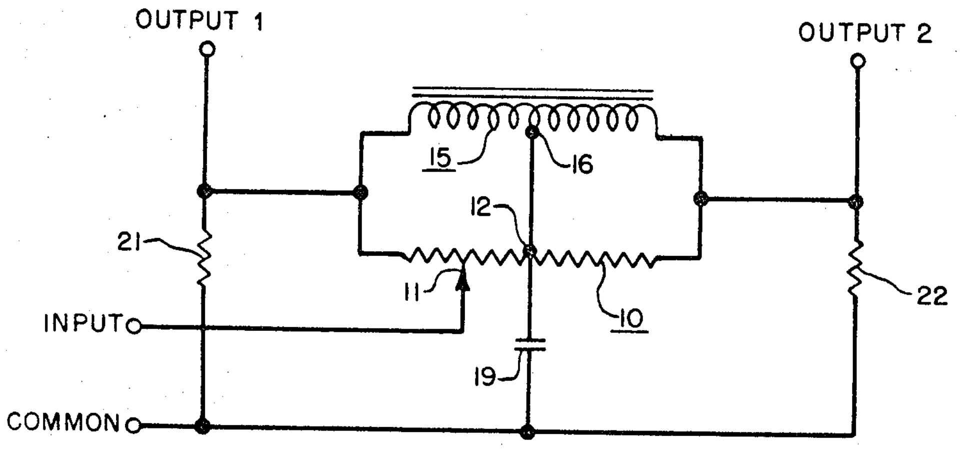

This invention relates to a novel delay network for translating, with an adjustable time delay and yet without appreciable attenuation or phase distortion, signal components included within a relatively wide frequency range. It is particularly useful in a subscription television receiver and will be described in that environment.

Most of the adjustable time or phase delay networks of the prior art are materially limited, frequencywise, in their performance due to phase distortion (unequal delay for different frequency components) to which an applied signal is subjected—particularly the higher frequency components of the signal. These previously developed variable delay networks are consequently unacceptable when it is necessary to impart an adjustable delay without phase distortion to a relatively wide band signal, such as a video signal which has frequency components extending up to 4.5 megahertz.

The delay network of the present invention constitutes a significant improvement over the prior art since it is capable of delaying a wide band signal for an adjustable time duration which will be substantially uniform or equal for all frequencies.

It would be desirable in some circuit environments to have a variable delay network for translating an input signal to two different outputs and to introduce a variable delay to one of the output signals relative to the other. It would also be advantageous if the output signals were of the same amplitude—one should not be attenuated with respect to the other. The delay network of the present invention fulfills these qualifications and develops a pair of equal amplitude output signals having an adjustable delay difference, and this is achieved by means of a relatively simple and economical arrangement of circuit components.

Moreover, because of the unique properties of the variable network of the invention, a new and improved decoding arrangement for a subscription television receiver is realized.

It is, therefore, an object of the present invention to provide a new and improved variable delay network.

It is another object to provide an adjustable delay network for imparting substantially the same selected delay to all frequency components of an input signal having a wide frequency range.

A further object is to provide a variable delay network of relatively simple construction for obtaining a uniform phase delay over a wide frequency band.

It is still another object of the invention to provide a delay network capable of obtaining from a single input signal two output signals of the same amplitude but having an adjustable delay difference.

An additional object of the invention is to provide a novel subscription television receiver.

A variable delay network, constructed in accordance with one aspect of the invention, comprises a center-tapped resistance and a center-tapped inductance each of which is connected between a pair of output terminals. The center taps of the resistance and inductance are joined. A capacitance is connected between the center taps and a common terminal. A first termination impedance is connected between one of the output terminals and the common terminal, while a second termination impedance is connected between the outer output terminal and the common terminal. The delay network also includes means for applying an input signal between the common terminal and a selected point along the resistance thereby to translate the signal to at least one of the termination impedances with a delay dependent on the particular point selected.

In accordance with another aspect of the invention, a subscription television receiver is provided for decoding a received television transmission, the video signal of which has been coded at a transmitter by delaying for a duration $\Delta t$ certain selected ones only of the lines of video information. The receiver comprises a first signal translating branch including a delay line for introducing to an applied video signal a nominal delay of duration $\Delta t$ with a tolerance range of $\pm$ duration D. There is a second signal translating branch for translating an applied video signal without imparting any significant time delay thereto. Means are provided for applying the coded video signal of the received television transmission to each of the branches with substantially equal amplitude and this means includes a variable delay network for imparting an adjustable time delay of up to duration D either to the signal delivered to the first branch or to the signal applied to the second branch. With this arrangement, the delay difference between the output video signals of the two branches may be adjusted to be precisely equal to duration $\Delta t$. The receiver also has means including an electronic selector switch for selecting the output signal from the second branch during the occurrence of each of the aforesaid certain lines of video information and for selecting the output signal from the first branch during the occurance of each of the other lines of video information, thereby to provide a decoded video signal.

Figure 2:
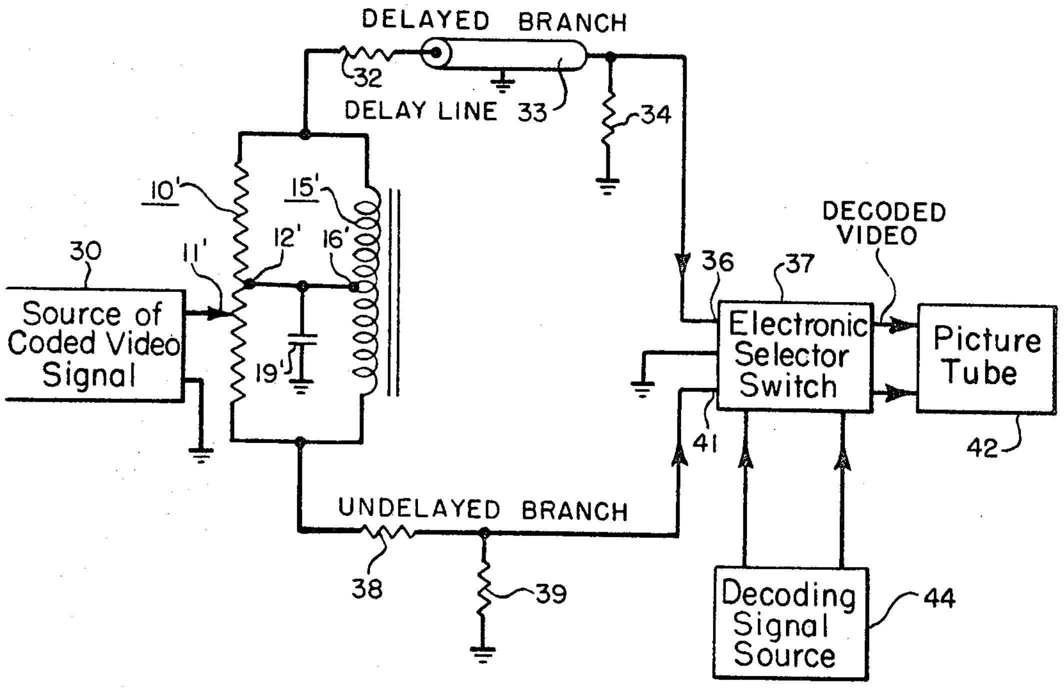

The features of this invention which are believed to be new are set forth with particularity in the appended claims. The invention, together with further objects and advantages thereof, may best be understood, however, by reference to the following description in conjunction with the accompanying drawing in which:

FIGURE 1 is a circuit diagram of a variable delay network which embodies the invention; and FIGURE 2 illustrates a particular circuit environment in which the network of FIGURE 1 may be advantageously incorporated; specifically, the network is employed in a subscription television receiver to precisely adjust the delay variation betwen two signals in a novel manner.

Turning now to FIGURE 1, the network there depicted has input, common, output 1 and output 2 terminals. A center-tapped resistance 10 is connected between the two output terminals. The resistance specifically takes the form of a potentiometer having a fixed center tap 12 and an adjustable tap or slider 11 that may be moved to any point along the resistance. Alternatively, center-tapped resistance 10 may have a series of spaced taps, slider 11 being capable of selectively engaging any one of the fixed taps. As another variation, in some applications of the invention it may only be necessary for slider 11 to selectively engage a portion of resistance 10. In that event, the center-tapped resistance may be made up of one or more fixed resistors plus a potentiometer all connected in series, the potentiometer being inserted along the resistance where desired and either on the left or right of its center tap 12.

A center-tapped inductance 15 is parallel connected to resistance 10 and consequently is also connected between the two output terminals. The center tap 16 of inductance 15 is connected to center tap 12 of the potentiometer. There is, of course, inductive coupling between the winding section of inductance 15 to the left of center tap 16 and the winding section to the right. Preferably, the inductance is wound so that the coefficient of coupling between the two sections is substantially equal to one. The center-tapped inductance thus effectively constitutes a transformer with a 1:1 turns ratio. It is also preferred that relatively low stray capacitance exist between the two winding sections.

A capacitance 19 is connected between the center taps and the common terminal. Termination impedances 21, 22, specifically resistances, are respectively connected between the output 1 and common terminals and between the output 2 and common terminals. Preferably, each of the termination resistances has the same value. The input terminal is connected to slider 11 of potentiometer 10. A signal to be delayed is applied between the input and common terminals, and hence between a selected point along resistance 10 and the common terminal. The impedance of the input signal source should be low compared to termination resistances 21, 22. A signal applied to the delay network is translated to each of resistances 21, 22, and therefore to each of outputs 1 and 2, with a delay dependent on the particular point at which adjustable tap 11 is established. The maximum time delay introduced by the network is directly proportional to the time constant provided by the resistance of one of the two sections of potentiometer 10 and capacitance 19.

By moving slider 1 from one end of resistance 10 to the other, a continuous variable delay may be obtained between the input signal and one of the output signals derived at outputs 1 and 2, and also between the two output signals. This is evident by considering different settings of potentiometer 10. With slider 11 at its extreme left-most position there will be no delay between the input signal and the output signal derived at output 1 but a maximum delay, which will be designated D, is imparted to the output signal derived at output 2. As slider 11 is moved toward center tap 12 the delay between the input signal and the signal at output 1 remains at zero while the delay between the input signal and the output 2 signal decreases to zero. When the slider is at the center tap there will be a zero delay to each of the output signals. As slider 11 is moved from center tap 12 toward its extreme right-most position the delay between the input signal and the output 2 signal remains at zero whereas the delay between the input signal and the signal at output 1 increases from zero to the maximum delay D.

Since up to the total delay of duration D may be imparted to either the signal at output 1 or the signal at output 2, a maximum delay difference or range of 2D is realized between the two output signals. To explain, when the slider is at its extreme left position the signal at output 2 is delayed from the signal at output 1 by the duration D. On the other hand, when slider 11 is positioned to its extreme right position the signal at output 1 is delayed from the signal at output 2 by the interval D. Hence, a maximum delay variation of ±D or 2D may be obtained between the output signals.

The delay network of FIGURE 1 should have a flat delay versus frequency characteristic so that it imparts a uniform delay to all of the frequency components of an input signal for any setting of resistance 10. It has been found, and can be demonstrated mathematically, that a substantially flat delay versus frequency characteristic and equal amplitude output signals may be obtained for a wide band input signal at all settings of potentiometer 10 if the following conditions are satisfied:

$$\frac{L}{C}=\frac{R_1^2}{4(1+\Sigma)}$$

where L is the electrical size or value of each of the two sections of center-tapped inductance 15, C is the value of capacitance 19, $R_1$ is the value of each of impedances 21, 22 (the impedances being equal), and $\Sigma=R_1/R$, where R is the value of each of the two sections of center-tapped resistance 10. A mathematical derivation and analysis of the above equation will confirm that if the conditions of the equation are met a network is obtained for translating a wide band video signal with equal amplitude outputs and without significant attenuation or phase distortion. The maximum delay of the network will be equal to $$\frac{\Sigma}{1+\Sigma}RC$$

FIGURE 2 illustrates, by way of example, one particular use to which the network of FIGURE 1 may be applied. The circuit elements in FIGURE 2 corresponding to elements in FIGURE 1 are designated by the same reference numerals, except primed. In FIGURE 2 the variable delay network is included in the decoding apparatus of a subscription television receiver constructed to decode or unscramble a received television signal that has been previously coded in the transmitter in accordance with a particular coding technique. Before FIGURE 2 will be described, however, preliminary consideration will be given to the type of coding that the illustrated receiver is designed to decode.

One way of scrambling a television signal to provide a subscription television service is to vary the time relation of the video and synchronizing components of the radiated signal to cause an unauthorized receiver to produce an image portions of which shift or "jitter" laterally with respect to each other on the picture tube screen. Such a system is shown in several patents—see, for example, Patent 3,244,806, which issued Apr. 5, 1966 in the name of George V. Morris, and is assigned to the present assignee. In the Morris patent the 525 line television picture (525 horizontal line traces per frame being standard in the United States) is cut into approximately 35 horizontal segments of 7 lines each. Alternate 7-line segments are continuously jittered or shifted back and forth horizontally between two operating modes or positions, while the divisions between these 7-line segments randomly shift their position. The amount of horizontal shift or displacement, designated by the interval $\Delta t$, of a delayed line of video information is small relative to the time duration of the entire line trace. Preferably, $\Delta t$ is 1.67 microseconds (i.e. $1.67\times10^{-6}$ seconds) which is small compared to the duration 63.4 microseconds of a complete line trace. At $\Delta t$ of that specific duration is particularly advantageous when a subscription television program is transmitted in color.

As described in the Morris patent, jitter-type coding of the video signal may be achieved at the transmitter by interposing in the video channel a pair of parallel paths or branches, one of which includes a delay line for imparting a delay of $\Delta t$, and an electronic selector switch that may be actuated between two operating conditions to render the two branches operable in alternation. In one condition, the branch having the delay line is switched into the video channel to delay the video with respect to the sync information by the interval $\Delta t$ thereby to establish one operating mode (the delay mode) of the system. In the other operating condition of the selector switch, the other branch is switched into the video channel so that the video signal is translated without the introduction of any significant time delay thereby to establish a disinctly different operating mode, which may be called the undelayed mode. The electronic switch in the transmitter is actuated, to effect mode changes, from one to the other of its two conditions every seven line traces in response to an applied square wave shaped coding signal which is randomly phase modulated.

The decoding apparatus in the receiver of the Morris patent operates in complementary fashion in order to decode the coded video signal received from the transmitter. A similar arrangement of two parallel branches, one including a delay line capable of introducing a delay $\Delta t$, and an electronic selector switch operated in precise step or synchronism with the switch in the transmitter may be employed in the receiver to delay by duration $\Delta t$ those lines of video information not delayed at the transmitter, while permitting the delayed lines of the received video signal to be translated through the receiver video channel without introducing any delay. In other words, when a delay $\Delta t$ is introduced at the transmitter between the occurrence of a radiated line-drive pulse and the video information occurring during the immediately succeeding line-trace interval, that line of video information is translated through the decoding apparatus with no delay, whereas when no delay is introduced at the transmitter a delay $\Delta t$ is imparted to the video signal in the decoder. In this way, each horizontal trace of video information is delayed for interval $\Delta t$ once, but no more than once, at either the transmitter or receiver.

FIGURE 2 schematically illustrates the subscription television receiver of the aforementioned Morris Patent 3,244,806 as it may be modified to include the variable delay network of FIGURE 1. The network is employed in FIGURE 2 to effectively adjust the delay imparted to the video signal to the end that the two parallel branches produce output video signals having a delay difference precisely equal to $\Delta t$. Unnecessary details of the Morris receiver have been omitted in FIGURE 2. Hence, reference may be made to Patent 3,244,806 for a more thorough explanation.

Block 30 in FIGURE 2 schematically represents all of the various circuits required to process and reduce a received coded television signal to a coded video signal. Specifically, block 30 includes a radio frequency amplifier, an oscillator-mixer, an intermediate frequency amplifier of one or more stages, and a video detector. Preferably it also comprises a video amplification stage. It will be noted that the common terminal of the network of FIGURE 1 is connected to a plane of reference potential, such as ground, in FIGURE 2. Thus, one output terminal of video signal source 30 is grounded while the other is connected to adjustable slider 11' of potentiometer 10'.

The connected upper terminals of resistance 10' and inductance 15' are coupled through a series resistor 32 to the input of a delay line 33, the output of which is properly terminated by a resistor 34 to avoid reflections. The output of delay line 33 is coupled to an input 36 of an electronic selector switch 37 having two different operating conditions. The connected lower terminals of resistance 10' and inductance 15' are coupled through a pair of resistors 38, 39 to ground, the junction of the resistors being connected to an input 41 of electronic switch 37. The required termination impedance for the upper terminals of units 10' and 15' is provided by resistor 32 plus the input impedance of delay line 33. Resistors 38 and 39 provide the necessary terminating impedance for the lower terminals of inductance 15' and resistance 10', and in addition introduce if necessary a slight attenuation to precisely match any attenuation introduced by delay line 33.

The output terminals of switch 37 are connected to the input of an image reproducer or picture tube 42. Preferably, a stage of video amplification (not shown) is interposed between the selector switch and picture tube. Switch 37 must be actuated between its two operating conditions in exact synchronism with the operation of the corresponding selector switch at the transmitter. This is accomplished by means of a phase modulated square wave shaped switching or decoding signal, developed by circuitry in block 44 and applied to switch 37 to effect actuation thereof, having a wave form identical to that of the coding signal produced in the transmitter. The circuitry, schematically represented by block 44, is shown in detail in the aforementioned Patent 3,244,806—Morris.

Since the delayed lines of the received coded video signal have been delayed in the transmitter by the duration $\Delta t$, it is imperative that a delay difference of exactly $\Delta t$ exist between the coded video signal translated through the delayed branch to input 36 and the coded video signal delivered through the undelayed branch to input 41. Note that a slight time delay may exist between the coded video signal at the output of source 30 and that signal as applied to input 41, but this is of no concern. It is the delay difference or variation between the signals on inputs 36 and 41 of switch 37 that must be maintained exactly at duration $\Delta t$. Otherwise, alternate 7-line segments will be slightly staggered in the decoded picture. Moreover, when a color television signal is being decoded color distortion arises.

Accordingly, delay line 33 is constructed to delay an applied video signal without phase distortion for an interval as close to $\Delta t$ as possible. Of course, if delay line 33 imparts a delay precisely equal to $\Delta t$, the variable delay network of the invention is not needed. It is difficult, however, to commercially produce on a mass production basis delay lines in accordance with the required close tolerances. As a practical matter, therefore, it is not economically feasible to mass produce delay lines each of which exhibits the precise time delay $\Delta t$, which is preferably $1.67\times10^{-6}$ seconds (or $1670\times10^{-9}$ seconds) as mentioned previously. As a consequence, it is expedient to employ a commercially producible delay line plus a variable delay network for effectively trimming or modifying the delay characteristic of the line.

It has been found that delay lines exhibiting a nominal delay of $1670\times10^{-9}$ seconds may be economically manufactured by holding the tolerances at $+89\times10^{-9}$ seconds. The adjustable delay network of the invention may easily be constructed to provide a continuous delay extending over such a tolerance range. The maximum delay D of the network will therefore be $89\times10^{-9}$ seconds or 89 nanoseconds. The delay network, by adjusting slider 11', can effectively add up to $89\times10^{-9}$ seconds to the delay of line 33 when the delay line itself exhibits less than the required $1670\times10^{-9}$ seconds, or the network can subtract up to $89\times10^{-9}$ seconds when delay line 33 introduces more delay than required. In the extreme lowermost position of slider 11', the coded video signal from source 30 is delayed the full amount D in the network plus the delay of line 33 before it is applied to input 36. In the extreme uppermost position of slider 11', the coded video signal is delayed in the variable network by the full amount D before it is applied to input 41. Line 33 imparts the only delay to the signal delivered to input 36. This effectively reduces the delay difference between the signals on inputs 36 and 41 which would otherwise be produced by the presence of delay line 33 alone. In other words, in the two extreme settings of potentiometer 10', the total delay D of the network is either added to the delayed branch or to the undelayed branch.

The delay network of FIGURES 1 and 2 has been constructed and successfully operated. An applied video signal was translated, without any significant phase distortion or attenuation and with equal amplitudes, to the two outputs of the network, the delay variation between the two output signals being coninuously adjustable up to $\pm89\times10^{-9}$ seconds. The electrical characteristics or values of the circuit components of the constructed delay network were as follows:

| | |
|---|---|
| Center-tapped resistance **10** | 940 ohms. |
| Center-tapped inductance **15** | coefficient of coupling between its two sections equal to one, and each section having a value 67 microhenries. |
| Capacitance **19** | 220 picofarads. |
| Termination impedance **21** | 3,000 ohms. |
| Termination impedance **22** | 3,000 ohms. |

While a particular embodiment of the invention has been shown and described, modifications may be made, and it is intended in the appended claims to cover all such modifications as may fall within the true spirit and scope of the invention.

I claim:

1. A variable delay network comprising:
first and second output terminals;
a center-tapped resistance connected between said first and second output terminals;
a center-tapped inductance also connected between said first and second output terminals, with the center taps of said resistance and inductance connected together;
a common terminal;
a capacitance connected between said center taps and said common terminal;
a first termination impedance connected between said first output terminal and said common terminal;
a second termination impedance connected between said second output terminal and said common terminal;
and means for applying an input signal between said common terminal and a selected point along said resistance thereby to translate said signal to at least one of said termination impedances with a delay dependent on the particular point selected.

2. A variable delay network according to claim 1 wherein said resistance includes a potentiometer, to the adjustable tap of which is applied said input signal.

3. A variable delay network according to claim 1 wherein the center tap of said inductance divides said inductance into two sections, the coefficient of coupling between said sections being substantially equal to one.

4. A variable delay network according to claim 1 in which said first termination impedance is substantially equal to said second termination impedance.

5. A variable delay network according to claim 1 in which said input signal is translated to both of said output terminals with equal amplitude and with a delay difference determined by the particular point, along said resistance, to which said input signal is applied.

6. A variable delay network according to claim 1 in which each of said termination impedances is a resistance.

7. A variable delay network comprising:
first and second output terminals;
a center-tapped resistance, connected between said first and second output terminals, divided by its center tap into two sections each of which has a value R;
a center-tapped inductance, also connected between said first and second output terminals, divided by its center tap into two sections with the coefficient of coupling therebetween being substantially equal to one and with each section having a value L;
a connection between the center taps of said resistance and inductance;
a common terminal;
a capacitance having a value C connected between said center taps and said common terminal;
a first termination resistance connected between said first output terminal and said common terminal;
a second termination resistance connected between said second output terminal and said common terminal, each of said termination resistances having substantially the same value $R_1$;
and means for applying an input signal between said common terminal and a selected point along said center-tapped resistance thereby to translate said signal to at least one of said termination resistances with a delay dependent on the particular point selected, said variable delay network satisfying the conditions $$\frac{L}{C}=\frac{R_1^2}{4(1+\Sigma)}$$

where $$\Sigma=\frac{R_1}{R}$$

8. A subscription television receiver for decoding a received television transmission, the video signal of which has been coded at a transmitter by delaying for a duration $\Delta t$ certain selected ones only of the lines of video information, said receiver comprising:
a first video signal translating branch including a delay line for introducing to an applied video signal a nominal delay of duration $\Delta t$ with a tolerance range of $\pm$ duration D;
a second video signal translating branch for translating an applied video signal without imparting any significant time delay thereto;
means for applying the coded video signal of the received television transmission to each of said branches with substantially equal amplitude and including a variable delay network for imparting an adjustable time delay of up to duration D either to the signal delivered to said first branch or to the signal applied to said second branch in order that the delay difference between the output video signals of said branches may be adjusted to be precisely equal to duration $\Delta t$;
and means including an electronic selector switch for selecting the output signal from said second branch during the occurrence of each of said certain lines of video information and for selecting the output signal from said first branch during the occurrence of each of the other lines of video information, thereby to provide a decoded video signal.

References Cited

UNITED STATES PATENTS

| | | | |
|---|---|---|---|
| 2,745,067 | 5/1956 | True et al. | 333—29 X |
| 2,983,782 | 5/1961 | Druz | 178—5.1 |
| 2,996,571 | 8/1961 | Nero | 178—5.1 |

RODNEY D. BENNETT, Jr., *Primary Examiner.*

M. F. HUBLER, *Assistant Examiner.*

U.S. Cl. X.R.

333—29